US 8,656,251 B2

(12) United States Patent
Sarcone et al.

(10) Patent No.: US 8,656,251 B2
(45) Date of Patent: Feb. 18, 2014

(54) SIMULTANEOUS DATA TRANSFER AND ERROR CONTROL TO REDUCE LATENCY AND IMPROVE THROUGHPUT TO A HOST

(75) Inventors: Christopher J. Sarcone, San Jose, CA (US); David G. Conroy, El Granada, CA (US); Jim Keller, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 188 days.

(21) Appl. No.: 13/224,714

(22) Filed: Sep. 2, 2011

(65) Prior Publication Data
US 2013/0061111 A1    Mar. 7, 2013

(51) Int. Cl.
*G11C 29/00* (2006.01)
(52) U.S. Cl.
USPC .......................... 714/763; 714/769; 714/773
(58) Field of Classification Search
USPC ........... 714/763, 769, 770, 773, 772, 761, 48, 714/49
See application file for complete search history.

(56) References Cited

U.S. PATENT DOCUMENTS

| | | | | |
|---|---|---|---|---|
| 5,379,417 A * | 1/1995 | Lui et al. | | 713/300 |
| 5,488,702 A * | 1/1996 | Byers et al. | | 726/26 |
| 5,490,148 A * | 2/1996 | Carson | | 714/704 |
| 2008/0313364 A1 * | 12/2008 | Flynn et al. | | 710/31 |
| 2011/0041005 A1 * | 2/2011 | Selinger | | 714/6 |

* cited by examiner

*Primary Examiner* — Fritz Alphonse
(74) *Attorney, Agent, or Firm* — Womble Carlyle Sandridge & Rice LLP

(57) ABSTRACT

The disclosed embodiments provide a system that transfers data from a storage device to a host. The system includes a communication mechanism that receives a request to read a set of blocks from the host. Next, upon reading each block from the set of blocks from the storage device, the communication mechanism transfers the block over an interface with the host. The system also includes an error-detection apparatus that performs error detection on the block upon reading the block, and an error-correction apparatus that performs error correction on the block if an error is detected in the block. The communication mechanism may then retransfer the block to the host after the error is removed from the block.

26 Claims, 4 Drawing Sheets

SIMULTANEOUS DATA TRANSFER AND ERROR CONTROL TO REDUCE LATENCY AND IMPROVE THROUGHPUT TO A HOST

BACKGROUND

1. Field

The present embodiments relate to storage devices for computer systems. More specifically, the present embodiments relate to techniques for simultaneously transferring data from the devices and performing error control on the data to reduce latency and improve throughput to a host.

2. Related Art

A modern computer system typically includes a motherboard containing a processor and memory, along with a set of peripheral components connected to the motherboard via a variety of interfaces. For example, a Serial Advanced Technology Attachment (SATA) interface may facilitate data transfer between a storage device (e.g., hard disk drive, optical drive, solid-state drive, hybrid hard drive, etc.) and the motherboard, while a Peripheral Component Interconnect Express (PCIe) bus may enable communication between the motherboard and a number of integrated and/or add-on peripheral components.

In addition, the throughputs and/or latencies of the interfaces may affect the rates at which data is transferred between components in computer systems. For example, a SATA interface may enable the serial transfer of data between a storage device and a motherboard at rates of up to 6 Gbits/s. Prior to transmission of the data over the SATA interface, error detection and/or correction may be performed on the data, thus increasing the latency of the data transmission. Also, 8 b/10 b encoding of the transmitted data may cause additional overhead. As a result, the SATA interface may provide an effective throughput of approximately 550 MB/s.

At the same time, devices connected to the interfaces are operating at progressively faster speeds. For example, a solid-state drive (SSD) may implement data striping and/or interleaving on multiple flash chips. In turn, read/write operations on the SSD may be performed in parallel on the flash chips, providing effective read/write speeds of over 700 MB/s on the SSDs. Consequently, data transfer between high-speed components in computer systems may be increasingly limited by the signaling capabilities of interfaces connecting the components.

Hence, what is needed is a mechanism for reducing the latencies and/or increasing the throughputs of interfaces between components in computer systems.

SUMMARY

The disclosed embodiments provide a system that transfers data from a storage device to a host. The system includes a communication mechanism that receives a request to read a set of blocks from the host. Next, upon reading each block from the set of blocks from the storage device, the communication mechanism transfers the block over an interface with the host. The system also includes an error-detection apparatus that performs error detection on the block upon reading the block, and an error-correction apparatus that performs error correction on the block if an error is detected in the block. The communication mechanism may then retransfer the block to the host after the error is removed from the block.

In some embodiments, the block is retransferred to the host in an out-of-order fashion. For example, the block may be retransferred to the host after subsequent blocks have been transferred to the host without errors.

In some embodiments, the system also includes an error-tracking apparatus that tracks the error correction of the block if the error is detected in the block. The error-tracking apparatus may add each block containing an error to a data structure. After the error is removed from the block, the error-tracking apparatus may remove the block from the data structure. Finally, after all of the blocks have been transferred to the host without errors (e.g., after the data structure has been emptied), the communication mechanism transmits a completion signal to the host to complete the transfer of data to the host.

In some embodiments, the blocks are transferred to the host over one or more lanes of the interface.

In some embodiments, the interface is a Peripheral Component Interconnect Express (PCIe) interface.

In some embodiments, the storage device corresponds to a non-rotating storage device. For example, the storage device may be a solid-state drive (SSD).

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
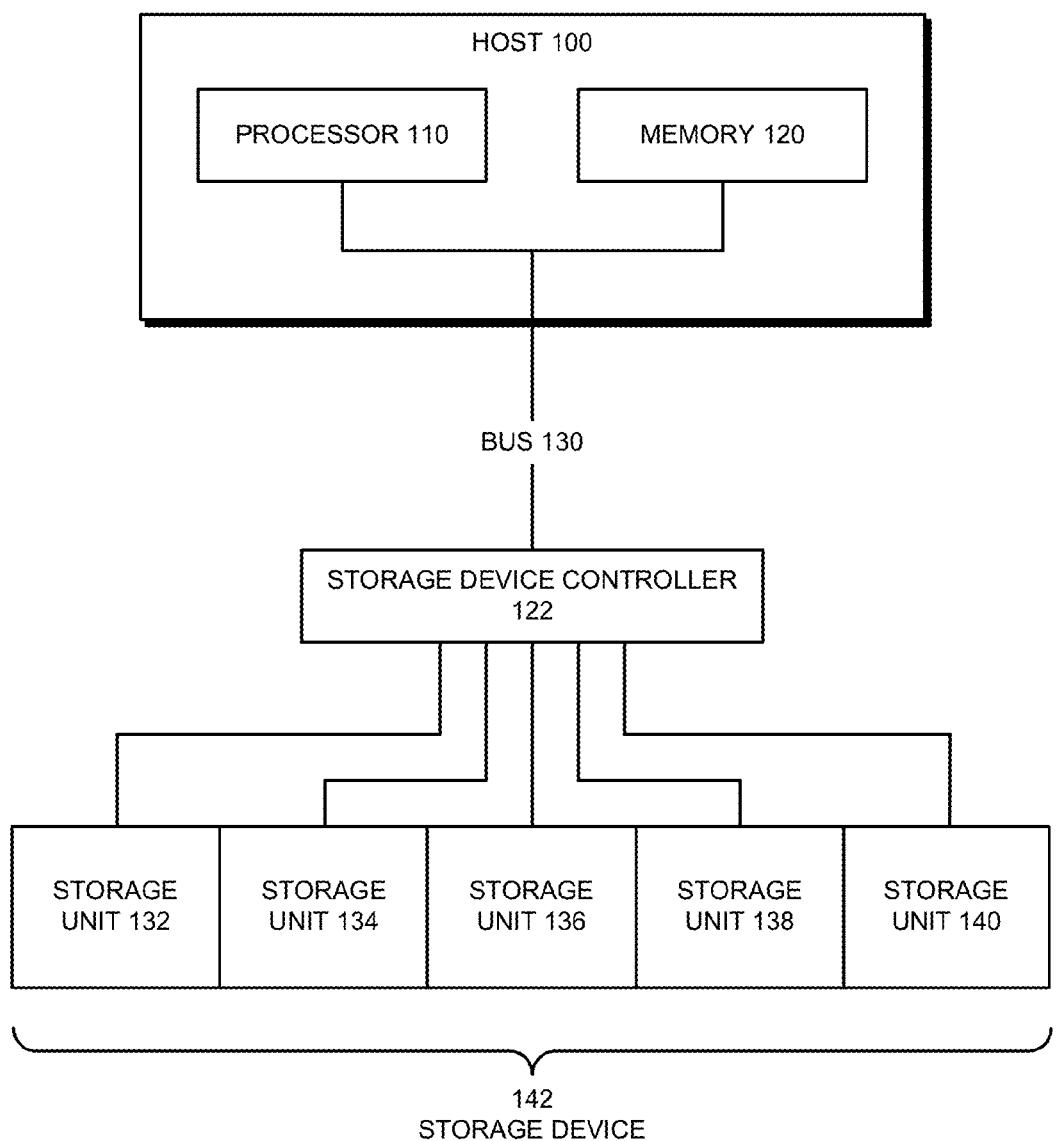
FIG. 1 shows a schematic of a system in accordance with an embodiment.

The disclosed embodiments provide a method and system for transferring data within a computer system. As shown in FIG. 1, the computer system may include a storage device 142 such as a solid-state drive (SSD) and/or hybrid hard drive (HHD). Storage device 142 may include one or more storage units 132-140, such as flash chips in an SSD and/or disks in an array (e.g., Redundant Array of Independent Disks (RAID)).

Storage device 142 may store data for a host 100 in the computer system. As shown in FIG. 1, host 100 may include a processor 110 and a memory 120. In addition, host 100 may read and write data on storage units 132-140 by communicating with a storage device controller 122 for storage device 142 over a bus 130. For example, processor 110 may obtain data stored on storage device 142 by transmitting a request for the data over bus 130 to storage device controller 122. Storage device controller 122 may process the request by reading the data from one or more storage units 132-140 and transferring the data over bus 130 to processor 110 and/or one or more locations in memory 120.

Those skilled in the art will appreciate that data transfer rates between host 100 and storage device 142 may be limited by the latency and/or bandwidth of bus 130. For example, bus 130 may correspond to a Serial Advanced Technology Attachment (SATA) bus that transfers data serially from storage device 142 to host 100 at rates of up to 6 Gbits/s. However, the data transfer rates over bus 130 may be limited by 8 b/10 b encoding overhead, as well as error correction and/or detection of the data prior to transmission of the data. Consequently, data may be transferred between storage device 142 and host 100 at an effective throughput of 550 MB/s or less.

On the other hand, storage device controller 122 may increase the speed of storage device 142 by implementing data striping and/or interleaving on multiple storage units 132-140. In turn, storage device controller 122 may perform read and write operations in parallel on storage units 132-140, thus reaching effective read/write speeds that exceed the data transfer rates of bus 130. In other words, bus 130 may represent the bottleneck in the transfer of data between host 100 and storage device 142.

In one or more embodiments, the system of FIG. 1 facilitates the transmission of data between host 100 and storage device 142 by reducing the latency of bus 130. For example, as discussed in further detail below with respect to FIG. 2, storage device controller 122 may process requests for data from host 100 by transferring blocks of data to host 100 as soon as the blocks are read from storage units 132-140. In doing so, storage device controller 122 may send the newly read blocks to memory 120 over one or more lanes of an interface such as a Peripheral Component Interconnect Express (PCIe) interface.

In one or more embodiments, the system of FIG. 1 may also facilitate the transmission of data between host 100 and storage device 142 by increasing the bandwidth of bus 130. For example, storage device controller 122 may utilize a 128 b/130 b encoding to reduce overhead associated with the transfer of data over the interface.

As a newly read block is transferred to host 100, storage device controller 122 may simultaneously perform error detection on the block. If an error is detected in the block, storage device controller 122 may perform error correction to remove the error while other blocks are being transferred to host 100. Once the error is removed, storage device controller 122 may retransfer the block to host 100 in an out-of-order fashion (e.g., after one or more other newly read blocks have been transferred). After all of the blocks have been transferred to the host without errors, storage device controller 122 may transmit a completion signal to the host to complete the request. By concurrently sending the blocks over a high-speed interface and performing error control on the blocks, storage device controller 122 may reduce the latency of data transmission from storage device 142 to host 100.

Figure 2:
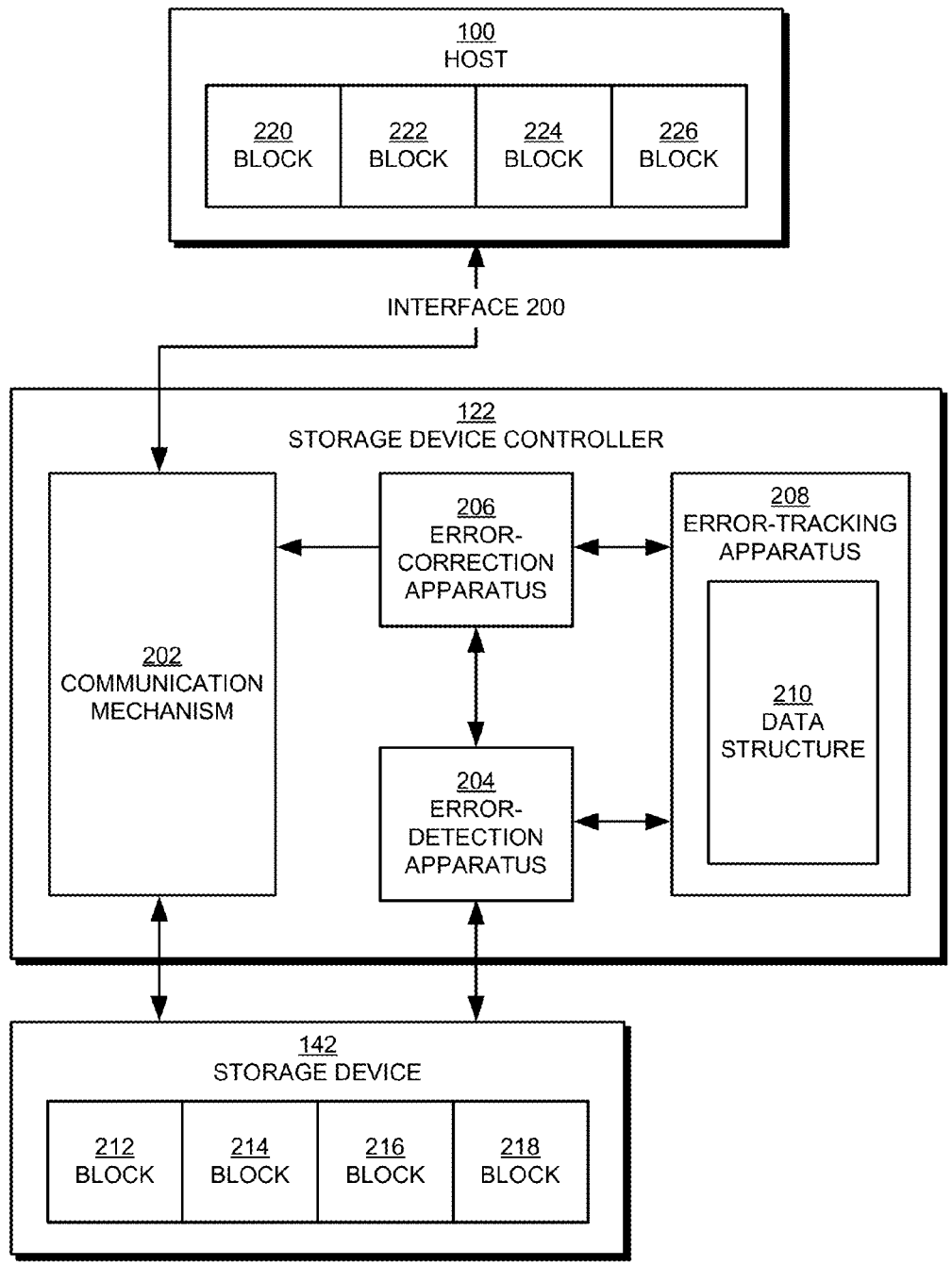
FIG. 2 shows the transfer of data from a storage device to a host in accordance with an embodiment.

FIG. 2 shows the transfer of data from storage device 142 to host 100 in accordance with an embodiment. The data transfer may be initiated by a request from host 100 to read a set of blocks 212-218 on storage device 142. The request may then be transmitted over an interface 200 and received by a communication mechanism 202 in storage device controller 122. For example, the request may be sent from a root complex in host 100 over a PCIe interface to a PCIe device in storage device controller 122.

To process the request, storage device controller 122 may read blocks 212-218 from one or more storage units (e.g., flash chips, disks, etc.) in storage device 142. For example, storage device controller 122 may stripe and/or interleave blocks 212-218 on multiple flash chips of an SSD. During subsequent reads of blocks 212-218, storage device controller 122 may increase the read speeds associated with storage device 142 by retrieving data for each block in parallel from the flash chips.

Once a block is read, communication mechanism 202 may transfer the block to host 100 over interface 200. For example, communication mechanism 202 may transfer the block by issuing a set of write commands containing data for the block over a PCIe interface. The write commands may be received by a root complex in host 100, forwarded to a memory controller, and used by the memory controller to update the corresponding block 220-226 of memory (e.g., memory 120 of FIG. 1) in host 100.

While the block is being transferred to host 100, an error-detection apparatus 204 in storage device controller 122 may perform error detection on the block. For example, error-detection apparatus 204 may examine redundant data which is added to the block, such as Reed-Solomon code and/or other error-correcting code (ECC), to determine if the block contains an error. If the block is free of errors and successfully transferred to host 100, storage device controller 122 may be finished with reading and transferring the block.

However, if one or more errors are detected in the block by error-detection apparatus 204, an error-correction apparatus 206 in storage device controller 122 may perform error correction on the block to remove the error(s). For example, error-correction apparatus 206 may examine the redundant data to locate the error(s) and correct the error values. While error-correction apparatus 206 removes errors from the block, communication mechanism 202 may continue transferring other blocks read from storage device 142 to host 100, and error-detection apparatus 204 may perform error detection on the blocks. Because the transfer of a newly read block is not dependent on the completion of error control for a previously read block, error-correction apparatus 206 may utilize a stronger ECC to correct errors in the previously read block without substantially increasing the latency of the transfer of the blocks from storage device 142 to host 100.

After error-correction apparatus 206 has removed the error(s) from the block, communication mechanism 202 may retransfer the block to host 100 to facilitate the accurate transmission of data from storage device 142 to host 100.

Because other blocks may be transferred to host 100 before the block is retransferred, the block may be retransferred in an out-of-order fashion. For example, storage device controller 122 may read blocks 212-218 in ascending order from storage device 142. As block 212 is transferred to host 100 over interface 200 (e.g., a PCIe interface) and written to block 220, error-detection apparatus 204 may detect an error in block 212. Error-correction apparatus 206 may then perform error correction on block 212 while blocks 214-218 are transferred to host 100 and written to blocks 222-226 without errors. Finally, after the error is removed from block 212 and blocks 214-218 have been successfully transferred to host 100, block 212 may be retransferred to host 100 and used to write over the erroneous data in block 220.

An error-tracking apparatus 208 in storage device controller 122 may additionally track errors that have been detected within the block. During the error correction, error-tracking apparatus 208 may add the block to a data structure 210 such as a queue and/or linked list. After all errors have been removed from the block (e.g., after one or more iterations between error-detection apparatus 204 and error-correction apparatus 206), error-tracking apparatus 208 may remove the block from data structure 210. Error-tracking apparatus 208 may thus maintain a list of blocks that have been transferred to host 100 with errors and that require retransfer to host 100 after error correction has been performed on the blocks.

In turn, error-tracking apparatus 208 may be used by storage device controller 122 to track the completion status of the request. For example, storage device controller 122 may maintain a separate list of blocks 212-218 requested by host 100. As each block is read and transferred to host 100, storage device controller 122 may remove the block from the list. On the other hand, the block may be added to data structure 210 if error-detection apparatus 204 detects errors in the block. After all blocks 212-218 have been read and transferred to host 100, the list may be emptied, while data structure 210 may contain blocks that require retransferring to host 100. Blocks may then be removed from data structure 210 as errors are removed from the blocks and the blocks are retransferred to host 100 without errors. Once the list and data structure 210 are both empty (e.g., after all blocks 212-218 have been transferred to host 100 without errors), storage device controller 122 may transmit a completion signal to host 100 to complete the request.

Consequently, storage device controller 122 may utilize parallelism, out-of-order data transfers, and/or repeated data transfers over interface 200 to improve communication between host 100 and storage device 142. First, storage device controller 122 may increase the bandwidth of data transfer to host 100 by reading data from multiple storage units in storage device 142 at the same time and sending the data in parallel over multiple lanes of interface 200. Next, storage device controller 122 may simultaneously transfer blocks to host 100 and perform error detection and/or correction on the blocks, thus reducing latency associated with transmission of data to host 100 after error control has been performed. Finally, after errors have been detected and removed from a block, storage device controller 122 may repeat the transfer of the block to host 100 in an out-of-order fashion to provide host 100 with error-free data from storage device 142.

Those skilled in the art will appreciate that storage device controller 122 may be implemented in a variety of ways. For example, communication mechanism 202, error-detection apparatus 204, error-correction apparatus 206, and error-tracking apparatus 208 may be provided by a single circuit and/or component. Alternatively, storage device controller 122 may utilize other combinations of integrated and discrete components, such as application-specific integrated circuits (ASICs), field-programmable gate arrays (FPGAs), microcontrollers, and/or microprocessors. Furthermore, storage device controller 122 may be configured to perform reads and writes on a variety of storage devices, including SSDs, HHDs, and/or other types of rotating and/or non-rotating storage devices.

Figure 3:
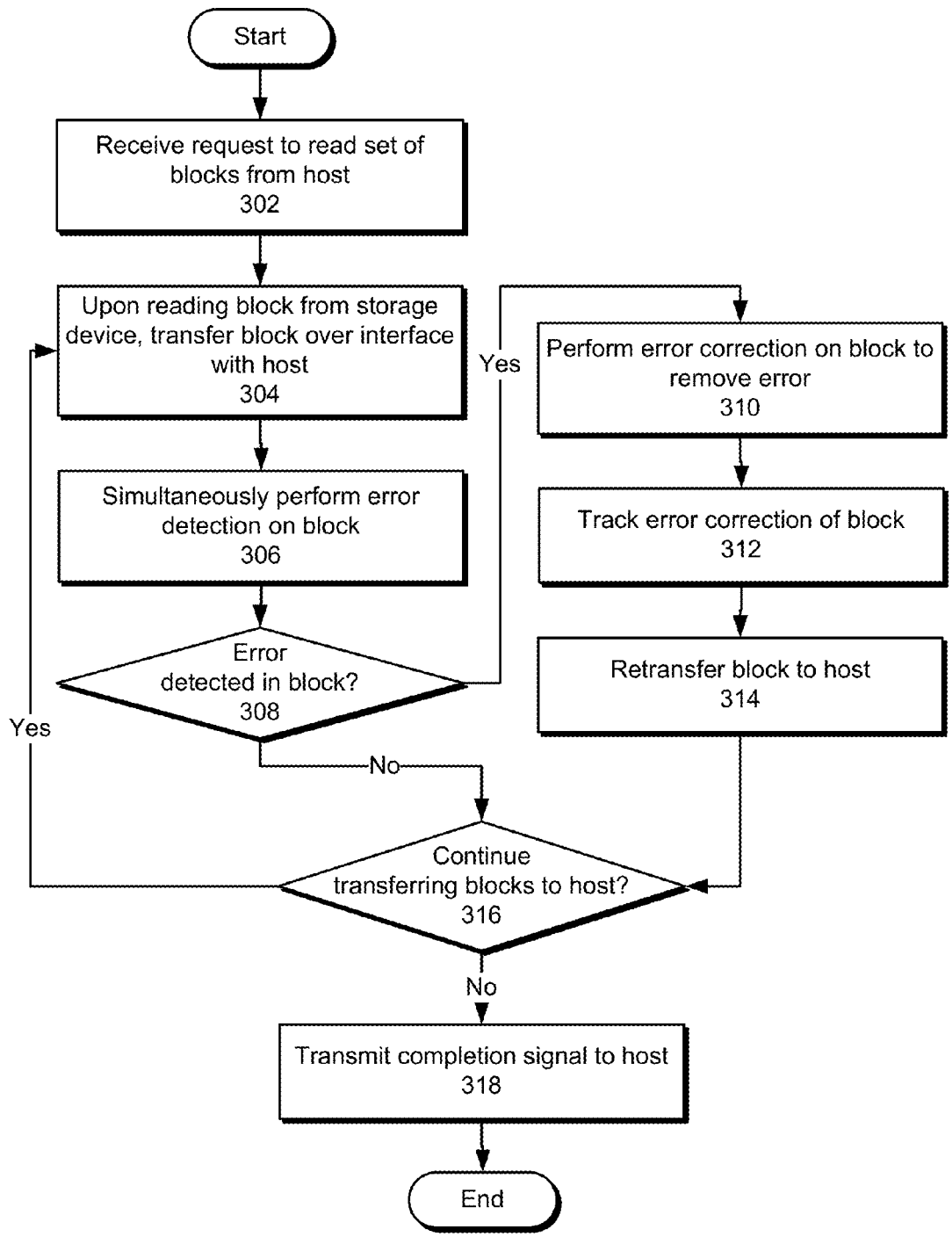
FIG. 3 shows a flowchart illustrating the process of transferring data from a storage device to a host in accordance with an embodiment.

FIG. 3 shows a flowchart illustrating the process of transferring data from a storage device to a host in accordance with an embodiment. In one or more embodiments, one or more of the steps may be omitted, repeated, and/or performed in a different order. Accordingly, the specific arrangement of steps shown in FIG. 3 should not be construed as limiting the scope of the embodiments.

First, a request to read a set of blocks from a host is received (operation 302). The host may include a processor and/or memory in a computer system. Next, a block is transferred over an interface with the host upon reading the block from the storage device (operation 304). For example, the block may be read in parallel from a set of flash chips in an SSD and transferred over one or more lanes of a PCIe interface to a root complex. The root complex may forward the block to a memory controller, and the memory controller may write the block to memory on the host.

Error detection on the block is also simultaneously performed (operation 306) as the block is transferred to the host to detect an error in the block (operation 308). If no errors are detected in the block, processing for the block may be complete after the block is transferred to the host. If an error is detected, error correction is performed on the block to remove the error (operation 310). In addition, the error correction of the block is tracked (operation 312). For example, the block may be added to a data structure during error correction. After all errors have been removed from the block, the block may be removed from the data structure. After error correction has been performed on the block, the block is retransferred to the host (operation 314) in an out-of-order fashion (e.g., after subsequent blocks have been transferred to the host).

Transfer of blocks to the host may continue (operation 316). For example, blocks may continue to be transferred until all requested blocks have been transferred to the host without errors. If block transfer is to continue, each newly read block is transferred to the host (operation 304), and error detection is simultaneously performed on the block (operation 306) to detect an error in the block (operation 308). If an error is detected, error correction is performed on the block (operation 310) and tracked (operation 312), and the block is subsequently retransferred to the host (operation 314) after the error is removed from the block. Finally, after all blocks have been transferred to the host without errors, a completion signal is transmitted to the host (operation 318) to conclude processing of the request.

Figure 4:
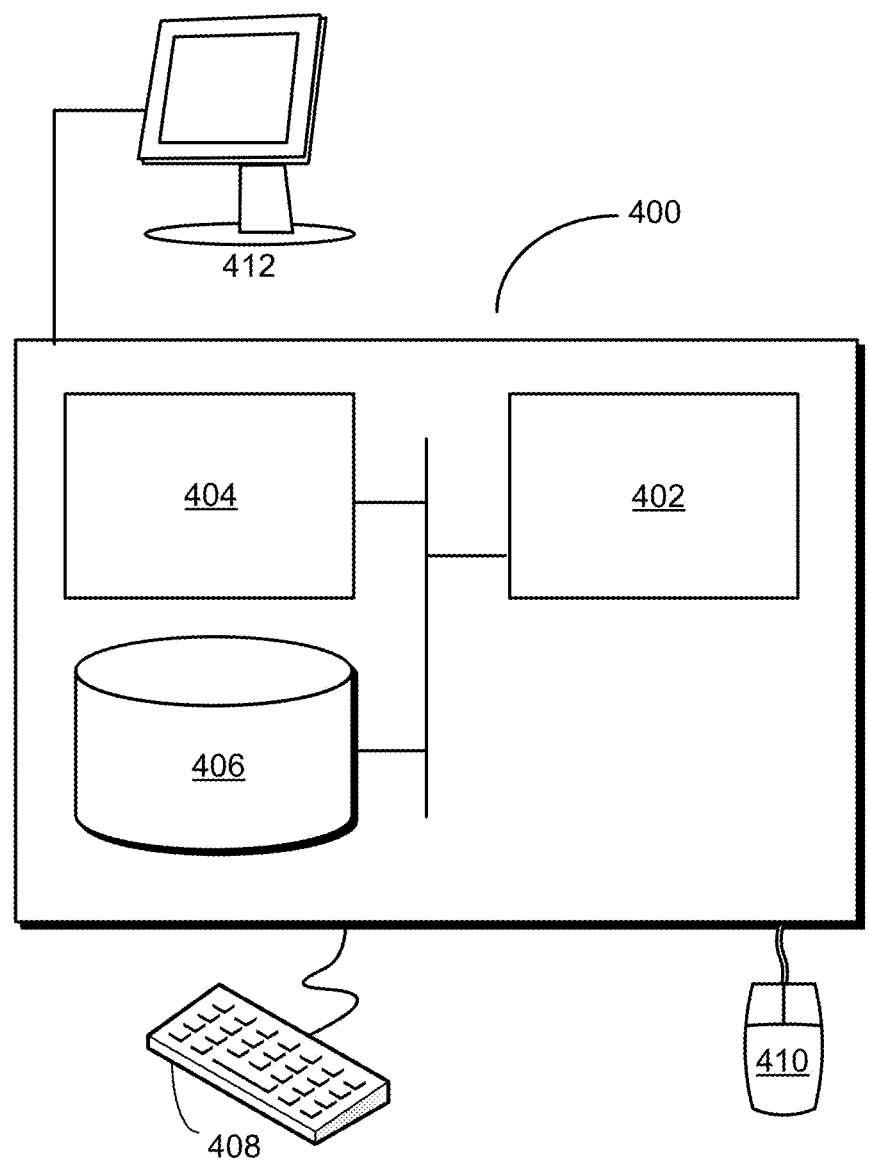
FIG. 4 shows a computer system in accordance with an embodiment.

FIG. 4 shows a computer system 400 in accordance with an embodiment. Computer system 400 may correspond to an apparatus that includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for transferring data from a storage device to a host. The system may include a communication mechanism that receives a request to read a set of blocks from the host. Next, upon reading each block from the set of blocks from the storage device, the communication mechanism may transfer the block over an interface with the host. The system may also include an error-detection apparatus that performs error detection on the block upon reading the block, and an error-correction apparatus that performs error correction on the block if an error is detected in the block. The communication mechanism may then retransfer the block to the host after the error is removed from the block.

The system may further include an error-tracking apparatus that tracks errors that have been detected within the block. For example, the error-tracking apparatus may add each block containing an error to a data structure. After the error is removed from the block, the error-tracking apparatus may remove the block from the data structure. Finally, after all of the blocks have been transferred to the host without errors (e.g., after the data structure has been emptied), the communication mechanism may transmit a completion signal to the host to complete the transfer of data to the host.

In addition, one or more components of computer system 400 may be remotely located and connected to the other components over a network. Portions of the present embodiments (e.g., communication mechanism, error-detection apparatus, error-correction apparatus, error-tracking apparatus, etc.) may also be located on different nodes of a distributed system that implements the embodiments. For example, the present embodiments may be implemented using a cloud computing system that transfers data between a remote storage device and a host.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for transferring data from a storage device to a host, comprising:
 receiving a request to read a set of blocks from the host;
 upon reading, from the storage device, each block from the set of blocks:
  transferring the block over an interface with the host, and simultaneously performing error detection on the block while transferring the block over the interface, wherein performing error detection comprises:
  determining whether an error is detected in the block,
  responsive to determining that an error is detected in the block, performing error correction on the block to remove the error, tracking the error correction of the block, and retransferring the block to the host after the error is removed from the block; and
 transmitting a completion signal to the host after the set of blocks has been transferred to the host without errors.

2. The computer-implemented method of claim 1, wherein the error correction on the block is performed simultaneously with transferring the block over the interface.

3. The computer-implemented method of claim 1, wherein tracking the error correction of the block involves:
 adding the block to a data structure; and
 after the error is removed from the block, removing the block from the data structure.

4. The computer-implemented method of claim 1, wherein the block is retransferred to the host in an out-of-order fashion.

5. The computer-implemented method of claim 1, wherein the blocks are transferred to the host over one or more lanes of the interface.

6. The computer-implemented method of claim 1, wherein the interface is a Peripheral Component Interconnect Express (PCIe) interface.

7. The computer-implemented method of claim 1, wherein the storage device corresponds to a non-rotating storage device.

8. A system for transferring data from a storage device to a host, comprising:
 a communication mechanism configured to:
  receive a request to read a set of blocks from the host; and
  transfer each block from the set of blocks via an interface with the host upon reading the block from the storage device;
 an error-detection apparatus configured to, upon reading the block, perform error detection on the block while simultaneously transferring one or more blocks via the interface, the one or more blocks including the block, wherein to perform error detection, the error detection apparatus is configured to determine whether an error is detected in the block;
 an error-tracking apparatus configured to track the error correction of the block if the error is detected in the block; and
 an error-correction apparatus configured to perform error correction on the block when an error is detected in the block,
 wherein the communication mechanism is further configured to retransfer the block to the host after the error is removed from the block, and further configured to transmit a completion signal to the host after the set of blocks has been transferred to the host without errors.

9. The system of claim 8, wherein the error correction on the block is performed simultaneously with transferring the one or more blocks via the interface.

10. The system of claim 8, wherein tracking the error correction of the block involves:
 adding the block to a data structure; and
 after the error is removed from the block, removing the block from the data structure.

11. The system of claim 8, wherein the block is retransferred to the host in an out-of-order fashion.

12. The system of claim 8, wherein the blocks are transferred to the host over one or more lanes of the interface.

13. The system of claim 8, wherein the interface is a Peripheral Component Interconnect Express (PCIe) interface.

14. The system of claim 8, wherein the storage device corresponds to a non-rotating storage device.

15. A non-transitory computer-readable storage medium storing instructions that when executed by a computer cause the computer to perform a method for transferring data from a storage device to a host, the method comprising:
 receiving a request to read a set of blocks from the host;
 upon reading, from the storage device, each block from the set of blocks:
  transferring the block over an interface with the host, and simultaneously performing error detection on the block while transferring one or more blocks, including the block, over the interface, wherein performing error detection comprises:
  determining whether an error is detected in the block,
  responsive to determining that an error is detected in the block, performing error correction on the block to remove the error, tracking the error correction of the block, and retransferring the block to the host after the error is removed from the block; and
  transmitting a completion signal to the host after the set of blocks has been transferred to the host without errors.

16. The computer-readable storage medium of claim 15, wherein the error correction on the block is performed simultaneously with transferring the one or more blocks over the interface.

17. The computer-readable storage medium of claim 15, wherein tracking the error correction of the block involves:
  adding the block to a data structure; and
  after the error is removed from the block, removing the block from the data structure.

18. The computer-readable storage medium of claim 15, wherein the blocks are transferred to the host over one or more lanes of the interface.

19. The computer-readable storage medium of claim 15, wherein the interface is a Peripheral Component Interconnect Express (PCIe) interface.

20. The computer-readable storage medium of claim 15, wherein the storage device corresponds to a non-rotating storage device.

21. A computer system, comprising:
  a host comprising:
    a processor; and
    a memory; and
  a storage device controller comprising:
    a communication mechanism configured to:
      receive a request to read a set of blocks from the host; and
      transfer each block from the set of blocks over an interface with the host upon reading the block from the storage device;
    an error-detection apparatus configured to, upon reading the block, perform error detection on the block while simultaneously transferring one or more blocks, including the block, over the interface, wherein to perform error detection, the error detection apparatus is configured to determine whether an error is detected in the block;
    an error-tracking apparatus configured to track the error correction of the block if the error is detected in the block; and
    an error-correction apparatus configured to perform error correction on the block when an error is detected in the block,
    wherein the communication mechanism is further configured to retransfer the block to the host after the error is removed from the block, and further configured to transmit a completion signal to the host after the set of blocks has been transferred to the host without errors.

22. The computer system of claim 21, wherein the error correction on the block is performed simultaneously with the error detection.

23. The computer system of claim 21, wherein tracking the error correction of the block involves:
  adding the block to a data structure; and
  after the error is removed from the block, removing the block from the data structure.

24. The computer system of claim 21, wherein the blocks are transferred to the host over one or more lanes of the interface.

25. The computer system of claim 21, wherein the interface is a Peripheral Component Interconnect Express (PCIe) interface.

26. The computer system of claim 21, wherein the storage device corresponds to a non-rotating storage device.

* * * * *